United States Patent [19]
Wagner

[11] Patent Number: 5,406,854
[45] Date of Patent: Apr. 18, 1995

[54] APPARATUS FOR MEASURING SMALL FLOWS OF A FLUID BEARING ULTRASOUND REFLECTING BITS, ON THE HIGH FREQUENCY ULTRASONIC DOPPLER PRINCIPLE

[75] Inventor: Georg F. Wagner, Berchtesgaden, Germany

[73] Assignee: Louise Wagner, Berchtesgaden, Germany

[21] Appl. No.: 894,075

[22] Filed: Jun. 5, 1992

[30] Foreign Application Priority Data

Jun. 7, 1991 [DE] Germany .......................... 41 18 809.8
Jun. 7, 1991 [DE] Germany .......................... 41 18 827.6
Mar. 6, 1992 [DE] Germany .......................... 42 07 031.7

[51] Int. Cl.⁶ .......................... G01F 1/66; G01W 1/00
[52] U.S. Cl. .................................. 73/861.25; 73/170.13
[58] Field of Search ................ 73/170.13, 579, 861.25; 128/660.07

[56] References Cited

U.S. PATENT DOCUMENTS

| | | | |
|---|---|---|---|
| 3,675,191 | 7/1972 | McAllister | 73/170.13 |
| 4,270,191 | 5/1981 | Peynaud | 73/170.13 |
| 4,413,531 | 11/1983 | Karplus et al. | 73/861.25 |
| 5,127,409 | 7/1992 | Daigle | 73/861.25 |
| 5,208,785 | 5/1993 | Brumley et al. | 73/170.13 |

FOREIGN PATENT DOCUMENTS

| | | |
|---|---|---|
| 0273385 | 12/1987 | European Pat. Off. . |
| 8903288.8 | 8/1989 | Germany . |
| 4008037A1 | 9/1990 | Germany . |
| 3-206967 | 9/1991 | Japan .................. 73/170.13 |

OTHER PUBLICATIONS

East German Journal "Messen, Steuern, Regeln", Berlin (1988), vol. 5, pp. 232 to 234.
British Journal "Medical and Biological Engineering", 1975, pp. 59 to 64.

*Primary Examiner*—Richard E. Chilcot, Jr.
*Assistant Examiner*—William L. Oen
*Attorney, Agent, or Firm*—Flynn, Thiel, Boutell & Tanis

[57] ABSTRACT

An apparatus for measuring small liquid and particle currents on the high-frequency ultrasonic Doppler principle, has three sound transducers (5, 6, 7) directed jointly either in or against the direction of flow (2), distributed over the circumference of the measuring tube (1). One transducer (5) is a transmitter and the two others (6, 7) are receivers. Two mixers (16, 17) are inserted between the transmitter and the two receivers for producing a differential signal from the master frequency and receiving frequency. A third mixer (18) is provided for producing a signal from the differential signal from the first mixer (16) and the differential signal from the second mixer (17).

16 Claims, 2 Drawing Sheets

FIG. 2
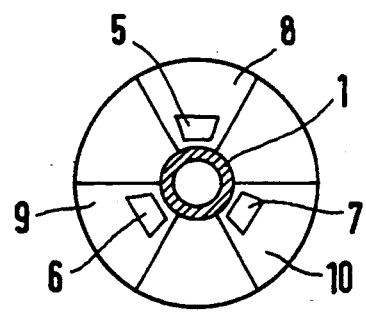
FIG. 3
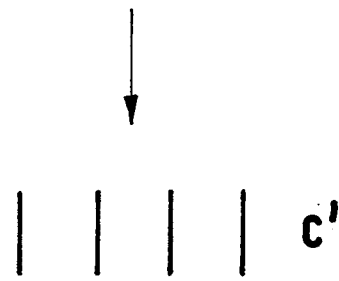

APPARATUS FOR MEASURING SMALL FLOWS OF A FLUID BEARING ULTRASOUND REFLECTING BITS, ON THE HIGH FREQUENCY ULTRASONIC DOPPLER PRINCIPLE

FIELD OF THE INVENTION

The present invention relates to an apparatus for measuring small liquid and particle currents in a measuring tube on the high-frequency ultrasonic Doppler principle.

DESCRIPTION OF THE PRIOR ART

Such ultrasonic Doppler flow measuring devices are known (cf. German utility model 89 03 288: East German journal "Messen, Steuern, Regeln" Berlin (1988), Vol. 5, pages 232 to 234: British journal "Medical and Biological Engineering" 1975, pages 59 to 64).

Compared to other methods of measurement using orifice plates, turbines and similar mechanical means in the flow, flow measurement on the ultrasonic Doppler principle is free from intervention so that it is also suitable in particular for flow measurement of abrasive, i.e. very hard, angular particles, and for highly reactive substances such as adhesives.

However, flow measurement on the ultrasonic Doppler principle is relatively imprecise compared with conventional methods, for example mechanical devices.

SUMMARY OF THE INVENTION

The invention is therefore based on the problem of improving the accuracy of flow measurement on the ultrasonic Doppler principle.

1. Brief Statement of the Invention

This is achieved according to the invention with the apparatus characterized in claim 1. The dependent claims state advantageous embodiments of the invention.

2. Aspects of Certain Embodiments of the Invention

The Doppler effect in liquids and other fluids is based on the particles in the fluid reflecting a directed sound ray with a frequency shift, the Doppler frequency, due to their relative motion between a transmitting and a receiving sound transducer.

It has been shown that an essential reason for the low measuring accuracy in flow measurement on the ultrasonic Doppler principle is that the reflection on the particles can lead to an obliteration of pulses due to interference.

With the inventive apparatus having e.g. two receivers, however, the third mixer provides a signal even if the first or second mixer fails to provide an output signal due to interference. Since an obliteration of signals by interference is very improbable in both receivers simultaneously, this substantially increases the measuring accuracy so that the inventive apparatus attains a measuring accuracy such as has been found hitherto only in mechanical devices.

In the inventive apparatus the sound transducers are preferably designed as piezoelectric oscillator wafers which are each disposed on a plane outer surface on the circumference of the measuring tube.

The plane surfaces on the outside of the measuring tube on which the piezoelectric oscillator wafers are located are inclined in accordance with the angle of arrival of the master frequency from the transmitting sound transducer relative to the longitudinal axis of the tube. As has been shown, it is advantageous to vary the angle of arrival in accordance with the inside diameter of the measuring tube. That is, it is advantageous to set the following condition:

$$\text{Angle of arrival (degrees)} = \frac{50}{1.09^{n-1}} \pm 20\% \text{ (preferably 10\%)}$$

wherein n signifies the distance between the two opposite plane surfaces of the inside wall of a prismatic measuring tube in millimeters, and the inside diameter of a round tube in millimeters.

This condition is based on experiments which have yielded the following optimal angle of arrival in accordance with the distance between these two surfaces: about 50° at 1 mm, about 40° at 3 mm, about 30° at 6 mm and about 25° to 30° at 8 mm.

The inventive apparatus is intended for measuring small particle currents or low flow rates down to fractions of a mm/s or, based on the volume of liquid, down to nl/s.

In particular, the inventive apparatus can be used for auantitative determination of adhesives such as cold glue, hot glue, cyanoacrylates, anaerobic adhesives, urethane acrylate adhesives, urethane acrylate resin, polyurethanes, epoxy resins and methacrylate resin. It is also suitable for quantitative determination of wax and of paints and lacquers. as well as for quantitative determination of oils and greases and of additives, e.g. corrosion inhibitors, to mention only a few examples.

Another essential field of application for the inventive apparatus is the volume measurement of solder pastes and slurries, in particular of ceramic and diamond particles.

For example, optimal geometrical dimensions (surface grinding,) must be maintained in the production of silicon wafers so that the following phases of operation, e.g. for chip production, can be performed accurately. Wafers are accordingly subjected to a surface treatment by lapping. The lapping machine is fed a lapping abrasive consisting of an aqueous slurry of hard particles, usually fine diamond or corundum particles. Since conventional mechanical devices for flow measurement cannot be used due to the high abrasion it was hitherto impossible to monitor or regulate exactly the amount of lapping abrasive fed. The same holds for other fine surface working methods such as honing, grinding or polishing.

As mentioned, the Doppler effect is based on particles in the fluid producing a frequency shift in a directed sound ray, after reflecting the sound ray, due to their relative motion between a transmitting and a receiving sound transducer.

However, in an ordinary tube with a small inside diameter the reflector particles move in the liquid current at different velocities depending on whether they are flowing in the middle or along the tube wall. An essential reason for the different flow rates of the stray particles is the friction of the carrier liquid on the tube wall. The Doppler measured-signal spectrum is therefore formed of a variety of differential frequencies, resulting in a relatively broad, low measured signal with an accordingly low signal-to-noise ratio.

If the reflector particles could be given a uniform velocity over the cross section of the tube one would thus obtain a sharp measured signal, i.e. a line spectrum, and thus permit precise and sensitive measurement of small liquid,currents in tubes with a small diameter.

In flow measurement on the ultrasonic Doppler principle a laminar flow impairs the sharpness of the Doppler measured signal since laminar flow forms its well-known velocity profile of parabolic cross section with the highest velocity in the center of the tube and velocity zero on the tube wall. The flow rate in the measuring tube must accordingly be adjusted in such a way as to produce a turbulent flow, i.e. a Reynolds number greater than 2300, in particular greater than 4000. For a uniform turbulent flow to come about in the tube in the measuring area, i.e. in the area of the sound lobe of the ultrasonic sensor, a sufficiently long advance path must be provided before the measuring area with the same inside diameter as that of the measuring area. As has been shown, this advance path should be at least ten times the diameter of the tube.

As mentioned, the inside diameter of the measuring tube of the inventive apparatus is relatively small, preferably 3 mm or less, at least in the area of the sound lobe of the ultrasonic transmitter.

The smaller the inside diameter of the tube the greater the measuring channel constant, i.e. the resolution. For example, at a transmitting frequency of 10 MHz the constant of the measuring head is 5 Hz/mm/s. This constant is, independently of the diameter, $$\frac{5 \text{ Hz}}{mm/s} = \frac{\text{Doppler frequency line (theoret.)}}{\text{Velocity in the measuring tube}}$$

At an inside diameter of the measuring tube of 3 mm the Doppler frequency is 5 Hz/mm, and at an inside diameter of 1 mm it is 50 Hz/mm. Doppler frequency $f_D$ results from:

$$f_D = 2 \, v f_0 \cdot \cos \alpha \cdot / c_M$$

wherein:
$f_0$ = transmitting frequency
$\alpha$ = angle of arrival
$v$ = flow rate of stray particles in area of ultrasonic lobe
$c_M$ = sound velocity in measuring head
However, flow rate v is inversely proportional to the square of the diameter of the tube.

Sharp Doppler measured signals are obtained if the inside wall of the measuring tube is made of plastics having an elastic modulus of more than 2500 MPa and a surface energy of less than 200 mN/m. Such a material may be for example polyoxymethylene, polyvinyl chloride, polymethyl methacrylate, aroyl-methyl methacrylate, polysulfone, polyacetal resin, polyethylene terephthalate, polycarbonate, epoxy resin, polyetherimide, polyetheretherketone, polyamidimide, polyimide or polybutylene terephthalate. A suitable material for the measuring tube for producing sharp Doppler measured signals has proven to be polyoxymethylene (POM), which has an elastic modulus of over 2500 MPa and a surface energy of 33 mN/m. At the same time POM is a relatively abrasion-resistant plastics material.

The measuring tube may have a concentric layer structure, the outer layer being made e.g. of steel or another material having a modulus of elasticity of more than 2000 MPa while the inner layer is made of a material with a surface energy of less than 200 mN/m. For example, the inner lining may be a fluorocarbon or fluorohydrocarbon polymer, such as polyvinylidencoliflouride (PVFD) or polytetrafluoroethylene (PTFE), while the outer layer is made of metal, such as steel, or ceramics, such as alumina, or glassy carbon. An inner lining of fluorocarbon or fluorohydrocarbon polymers or polyethylene is particularly suitable for measuring tubes used for measuring cyanoacrylate adhesives.

A low surface energy is the more important the smaller the inside cross section of the measuring tube is. The effect of the surface energy extends substantially to only a few tenths of a millimeter. This means that at a cross section of the measuring tube of more than 10 mm the importance of the surface energy decreases. The same holds for the wall roughness.

Along with a low surface energy on the inside wall of the measuring tube, it is crucial for the measuring tube to be made of a material having a modulus of elasticity (tension) of at least 2500 MPa (2500 N/mm$^2$). For example, polymethyl methacrylate (PMMA) has an elastic modulus of about 3300 MPa, and iron about 22000 MPa.

Provided it does not exceed a layer thickness of 0.5 mm the inner lining can also be made of a material with an elastic modulus of less than 2500 MPa, e.g. polyethylene, polypropylene (PTFE) or parylene. A suitably thin tube of polytetrafluoroethylene or another fluorocarbon or fluorohydrocarbon polymer may also be inserted into the outer tube.

Plastic tubes and tubes with an inner lining of plastics are unsuitable for flow measurement of abrasive particles. On the other hand, a metal tube, e.g. an iron tube, has a much less favorable flow velocity profile than a plastic tube with the same diameter when it comes to obtaining a spectrum with sharp peaks. As experiments have shown, this spectrum is not substantially improved if the iron measuring tube is polished smooth on the inside with considerable effort. Even poorer results were obtained with commercially available hot-worked steel tubes.

It has now turned out, surprisingly enough, that if one uses a measuring tube made of steel which has been worked cold instead of hot one obtains a spectrum with sharp peaks, even with an inside diameter of the tube of less than 3 mm or even less than 2 mm.

This is possibly because cold-worked steel has lower surface roughness than hot-worked steel from the start, and the crystallization structure in steel is more highly destroyed by cold working, e.g. by cold drawing, than in a hot-worked steel tube. Crystals in steel lead to annihilation of the directed high-frequency ultrasonic ray and thus to accordingly high "noise" or interference, resulting in poorly utilizable peaks. Particularly good results were observed with cold-drawn tubes made of chromium-nickel steel, in particular the steel qualities according to DIN-material nos. 1.4301, 1.4305 and 1.4571.

An excellent material for the measuring tube is also glassy carbon, as described e.g. in Z. Werkstofftech. 15, pages 331 to 338 (1984).

The measuring tube can extend through a ring-shaped carrier on which the plane outer surfaces are provided for carrying the sound transducers designed as piezoelectric oscillator wafers. The carrier is likewise preferably made of a material with an elastic modulus of at least 2500 MPa, for example PMMA, in particular cast PMMA. PMMA has the additional advantage of being transparent so that one can check whether the ring-shaped carrier is connected firmly and in acoustically coupled fashion to the measuring tube e.g. with an adhesive.

The measuring tube may have a circular cross section. However, a circular cross section leads to a certain scattering of the directed ultrasonic ray and thus to a broad Doppler signal peak, i.e. a low signal-to-noise ratio. This is due to the fact that the path of the sound ray from the plane surfaces on which the laminar transmitting sound transducer or transducers are located through the tube wall varies in length due to the curvature of the tube wall. The same holds for the path of the sound ray through the tube wall to the plane surface or surfaces on which the laminar receiving sound transducers are located.

A measuring tube with a prismatic cross section, i.e. a rectangular or hexagonal cross section, is therefore preferable to a measuring tube with a circular cross section. However, a tube with a prismatic cross section is generally more expensive.

In a tube with a rectangular, in particular square, cross section the transmitting sound transducer can be disposed on one surface and the two receiving sound transducers beside the transmitting sound transducer on one or the other surface of the prism offset by 90° from the transmitting sound transducer.

If the measuring tube has a hexagonal cross section the transmitting sound transducer can be disposed on one surface of the prism and the two receiving sound transducers on the two surfaces offset by 120° from the transmitting sound transducer.

A hexagonal or even octagonal cross section of the measuring tube is generally preferable to a rectangular cross section because the flow rate is more highly reduced in right-angled corners than in corners with an angle of 120° or more.

When "transmitting and receiving sound transducers" are spoken of here, it should be noted that the transmitting and receiving sound transducers have the same design and are only switched as the transmitting or receiving sound transducer. A transmitting sound transducer can thus be switched over to be a receiving sound transducer and vice versa.

To permit joint alignment of the sound transducers either in or against the direction of flow the tube can be provided in or on the outside with surfaces having wedge-shaped grooves, the piezoelectric oscillator wafers being disposed on the corresponding faces of these grooves. In a tube with a prismatic cross section, for example, it is also possible to fasten wedge-shaped parts to the corresponding plane outer surfaces of the tube in order to dispose the piezoelectric oscillator wafers thereon. These wedge-shaped parts should likewise be made of a material having an elastic modulus of at least 2500 MPa, i.e. for example PMMA, in particular cast PMMA.

BRIEF DESCRIPTION OF THE DRAWINGS

The invention shall be explained in more detail below with reference to the schematic drawing, in which:

FIG. 2 shows a plan view of the measuring point on the measuring tube: and

FIG. 3 shows the mixing of the signals in the third mixer.

DESCRIPTION OF THE PREFERRED EMBODIMENTS

Figure 1:
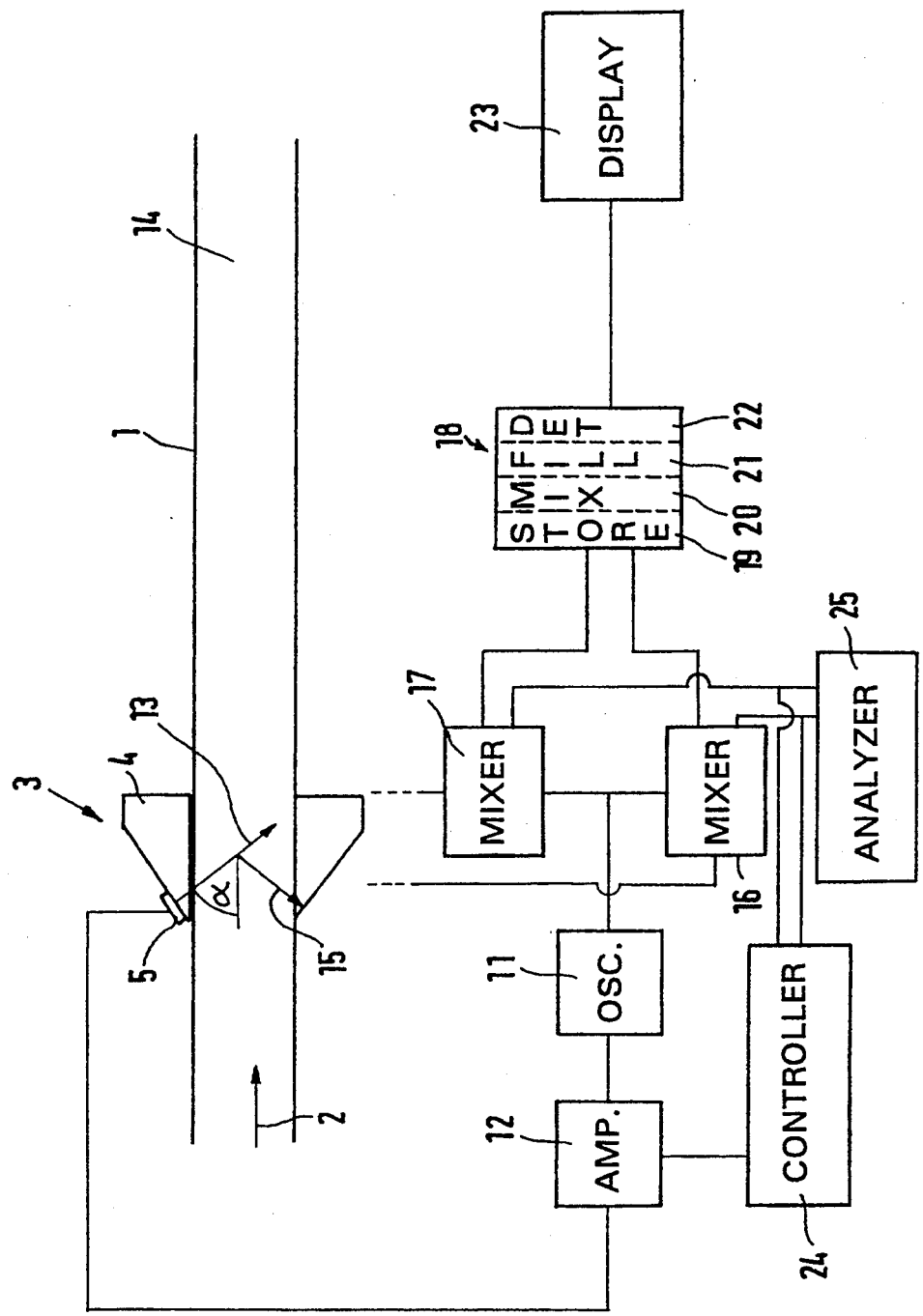
FIG. 1 shows a measuring tube with a block diagram of the ultrasonic Doppler measuring apparatus according to one embodiment of the invention.

According to FIG. 1 a liquid current flows through a measuring tube 1 in the direction of arrow 2. On measuring tube 1 a measuring point 3 is provided which comprises a ring-shaped carrier 4 disposed coaxially with measuring tube 1 and having disposed thereon three sound transducers 5, 6 and 7 designed as piezoelectric oscillator wafers, as apparent from FIG. 2.

Carrier 4 is of conic design, and sound transducers 5, 6 and 7 are disposed on outer surfaces 8, 9, 10 surface-ground into the conic surface and offset by 120°. Sound transducer 5 switched as a transmitting sound transducer is disposed on outer surface 8, and sound transducers 6 and 7 switched as receiving sound transducers on outer surfaces 9 and 10. The three sound transducers 5, 6 and 7 lie in a cross-sectional plane of measuring tube 1.

A high-frequency oscillator 11 with a transmitting frequency of e.g. 1 to 20 MHz provides the ultrasonic transmitting frequency which is amplified by an amplifier 12 and fed to transmitting sound transducer 5. From transmitting sound transducer 5, ultrasound 13 (master frequency) is radiated obliquely into the liquid in direction of flow 2 with an angle of arrival a to longitudinal axis 14 of the tube. At an inside diameter d of the tube of 6 mm, angle of arrival $\alpha$ is preferably about 30°.

If a particle is located in the liquid in the sound lobe produced by ultrasound 13, the latter is reflected on the particle and reflected radiation 15 (receiving frequency), which has a frequency shift due to the Doppler effect, is converted into an electric signal by the two receiving sound transducers 6, 7.

The electric signal produced by receiving sound transducer 6 is fed to a first mixer 16 in which the subtraction of the master frequency and receiving frequency takes place, providing the first differential or Doppler signal.

Frequency-shifted radiation 15 reflected by the above-mentioned particle is simultaneously detected by second receiving sound transducer 7 which produces a corresponding electric signal to be fed to a second mixer 17 in which the subtraction of the master frequency and receiving frequency likewise takes place, resulting in the second Doppler signal.

The first Doppler signal produced in first mixer 16 and the second Doppler signal produced in second mixer 17 are fed to a third mixer 18 in which the Doppler signals from first mixer 16 and second mixer 17 are mixed, as explained in more detail below with reference to FIG. 3.

In FIG. 3 a is the pulse train produced by first mixer 16 and b the pulse train produced by second mixer 17. Pulse trains a and b are converted into the digitized form shown schematically in the drawing by a' and b' and are fed to third mixer 18. An amplitude is obliterated from pulse train b by interference effects, for example by the radiation reflected by other particles.

Third mixer 18 has a pulse storage unit 19 to which digitized pulses a' and b' are fed. Pulses a' and b' are then mixed in a mixer 20. If it has been ascertained in pulse storage unit 19 that an amplitude is missing in one pulse train, as in the case of pulse train b', or in both pulse trains simultaneously, the mixed signal is filled up accordingly in a pulse filler 21 so as to form the pulse train designated as c' in FIG. 3.

A further unit 22 ascertains (detects) whether at least two amplitudes are missing successively in both pulse trains a' and b' at the same time. This means that the flow is no longer moving, i.e. has ended.

This can be utilized for precise determination of very small amounts of liquid, as the following example shows. The frequency of the Doppler signals according to wave trains a and b is for example such that the distance between two amplitudes is 1 ms. That is, it can be ascertained with reference to the Doppler frequency how great the flow rate is and, if two amplitudes are missing, stated with a precision of 2 ms that the flow has stopped. Flow pulses with a duration of e.g. less than 100 ms can thus be exactly detected. It is therefore possible to determine very small amounts of liquid exactly with the inventive apparatus, for example if an electromagnetically operated dosing pump is used which issues the medium in droplets. The signal formed by mixer 18 is then fed to a display means 23.

The signal provided by first and/or second mixers 16, 17 is fed at the same time to a controller 24 which amplifies the power of amplifier 12 so as to be inversely proportional, to the amplitude of pulse train c' coming from mixer 18. Such a controller 24 is advantageous in particular if measuring tube 1 has a large diameter.

Gas bubbles in the liquid being measured may lead to considerable disturbances, for example if an adhesive or a solder paste is to be applied to a workpiece as a bead and this bead is interrupted by such a gas bubble.

In order to prevent this, first mixer 16 and second mixer 17 can be connected with an analyzer 25 for detecting the frequency and the amplitude of the Doppler signals. A Doppler signal coming from such a gas bubble has a particularly high amplitude. In case of a high amplitude, analyzer 25 therefore operates e.g. an actuator that feeds the liquid located between measuring point 3 and the discharge end in tube 1 to a waste vessel, for example.

Accordingly, it can be seen from the foregoing that the present invention is useable with flows containing ultrasound reflecting bits of various kinds, including not only solid particles but also gas bubbles.

I claim:

1. An apparatus dependent on movement of ultrasound reflecting bits in a flowing fluid for measuring small fluid flows in a measuring tube on the high-frequency ultrasonic Doppler principle, comprising at least three sound transducers directed jointly either in or against the direction of flow, and distributed over the circumference of the measuring tube, and adapted to be switched as one transmitter and two receivers or as two transmitters and one receiver, first means responsive to movement of reflecting bits in the fluid flow for producing a first differential signal and further responsive to possible interference between moving reflecting bits for momentarily failing to produce said first differential signal, second means responsive to movement of reflecting bits in the fluid flow for producing a second differential signal and further responsive to possible interference between moving reflecting bits for momentarily failing to produce said second differential signal, said first means comprising a first mixer, said second means comprising a second mixer, said two mixers being inserted between the transmitter and the two receivers or between the two transmitters and the receiver for each producing a differential signal from a master frequency transmitted by its corresponding transmitter and a receiving frequency received by its corresponding receiver, and third means coupled to said first and second mixers and responsive to differential signals from both of said first and second mixers and alternately responsive to a differential signal from only one of said mixers for producing an output signal indicative of reflective bit-bearing fluid flow, said third means comprising a third mixer, whereby said third mixer produces said output signal even when interference between particles in the fluid causes one of said first and second mixers to fail to produce a differential signal.

2. The apparatus of claim 1, wherein the measuring tube (1) has plane outer surfaces (8, 9, 10) on which the sound transducers (5, 6, 7) designed as piezoelectric oscillator wafers are disposed.

3. The apparatus of claim 2, wherein the measuring tube (1) extends through a ring-shaped carrier (4) on which the plane outer surfaces (8, 9, 10) are provided.

4. The apparatus of claim 1, wherein the measuring tube (1) has a prismatic cross section and the sound transducers (5, 6, 7) are each disposed on different surfaces of the prism.

5. The apparatus of claim 1, wherein the master frequency from the transmitting sound transducer (5) is radiated into the fluid with an angle of arrival ($\alpha$) to the longitudinal axis (14) of the tube in accordance with the following condition:

$$\text{Angle of arrival } (\alpha) = \frac{50}{1.09^{n-1}} \pm 20\%$$

wherein n is the inside diameter of the measuring tube (1) in millimeters.

6. The apparatus of claim 1, wherein the inside diameter of the measuring tube (1) is 0.2 mm to 15 mm.

7. The apparatus claim 1, wherein the measuring tube (1) is made of cold-worked steel.

8. The apparatus of claim 1, wherein the measuring tube (1) is made, at least on the inside wall, of a material having a surface energy of less than 200 mN/m.

9. The apparatus of claim 1, wherein said differential signals comprise pulses and the third mixer (18) compares the pulses from the first mixer (16) and the second mixer (17) with each other.

10. The apparatus of claim 9, wherein if a predetermined number of pulses are missing from the first mixer (16) and/or the second mixer (17) the third mixer (18) fills in the missing pulses.

11. The apparatus of claim 10, wherein if the predetermined number of missing pulses from the first mixer (16) and the second mixer (17) is exceeded the third mixer (18) indicates the end of flow.

12. The apparatus of claim 1, including an analyzer (25) for detecting the amplitude of pulses outputted by the first and second mixers.

13. The apparatus of claim 1, including a controller (24) is for amplifying the power of the transmitting sound transducer or transducers (5) in accordance with the amplitude of pulses outputted from the first mixer (16) and/or the second mixer (17).

14. The apparatus of claim 1 in which said reflecting bits are solid particles in the fluid flow.

15. The apparatus of claim 1 in which said reflecting bits are gas bubbles in a liquid flow.

16. An apparatus dependent on movement of ultrasound reflecting bits in a flowing fluid for measuring small fluid flows in a measuring tube and based on the high-frequency ultrasonic Doppler principle, comprising:

at least three sound transducers all directed in the same direction of flow, namely all being directed in the direction of flow or all being directed against the direction of flow, such sound transducers being distributed over the circumference of the measuring tube, and adapted to be switched as one transmitter and two receivers or as two transmitters and one receiver, first means responsive to movement of reflecting bits in the fluid flow for producing a first differential pulse signal and further responsive to possible interference between moving reflective bits for momentarily failing to produce said first pulse differential signal, second means responsive to movement of reflecting bits in the fluid flow for producing a second differential pulse signal and further responsible to possible interference between moving reflecting bits for momentarily failing to produce said second differential pulse signal, said first means comprising a first mixer, said second means comprising a second mixer, said two mixers being inserted between the transmitter and the two receivers or between the two transmitters and the receiver for each producing a differential pulse signal from a master frequency transmitted by its corresponding transmitter and a receiving frequency received by its corresponding receiver, and third means coupled to said first and second mixers in responsive to trains of digitized differential pulse signals from both of said first and second mixers and alternatively responsive to a train of digitized differential pulse signals from only one of said mixers for producing an output signal indicative of reflective bit-bearing fluid flow, said third means comprising a third mixer, said third mixer having means for storing said trains of digitized differential pulses from said first and second mixers respectively and means responsive to absence of a pulse amplitude in one of said pulse trains but not in the other for producing an output digitized pulse train with such absent pulse amplitude replaced and further responsive to a pulse amplitude simultaneously absent from both pulse trains for indicating that the fluid does not flow.

* * * * *

UNITED STATES PATENT AND TRADEMARK OFFICE
CERTIFICATE OF CORRECTION

PATENT NO. : 5,406,854
DATED : April 18, 1995
INVENTOR(S) : Georg F. WAGNER

It is certified that error appears in the above-indentified patent and that said Letters Patent is hereby corrected as shown below:

Column 8, line 28; after "apparatus" insert ---of---.
line 49; delete "is".

Signed and Sealed this

Twenty-fourth Day of October, 1995

Attest:

BRUCE LEHMAN

Attesting Officer          Commissioner of Patents and Trademarks